(12) United States Patent
Choi et al.

(10) Patent No.: US 8,824,777 B2
(45) Date of Patent: Sep. 2, 2014

(54) METHOD OF POST-CORRECTION OF 3D FEATURE POINT-BASED DIRECT TEACHING TRAJECTORY

(75) Inventors: Tae Yong Choi, Daejeon (KR); Chan-Hun Park, Daejeon (KR); Hyun Min Do, Daejeon (KR); Jin-Ho Kyung, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 186 days.

(21) Appl. No.: 13/542,760

(22) Filed: Jul. 6, 2012

(65) Prior Publication Data
US 2013/0236050 A1 Sep. 12, 2013

(30) Foreign Application Priority Data
Mar. 6, 2012 (KR) .................. 10-2012-0023054

(51) Int. Cl.
*G06K 9/00* (2006.01)
(52) U.S. Cl.
USPC ............... 382/153; 700/245; 348/135; 901/2
(58) Field of Classification Search
USPC .................. 382/100, 103, 107, 153, 154; 700/245–264; 348/135, 169–172; 901/2–50
See application file for complete search history.

(56) References Cited

U.S. PATENT DOCUMENTS

| | | | | |
|---|---|---|---|---|
| 4,453,085 A | * | 6/1984 | Pryor | 250/203.1 |
| 4,621,333 A | * | 11/1986 | Watanabe | 700/257 |
| 5,021,970 A | * | 6/1991 | Mohri et al. | 700/254 |
| 5,051,675 A | | 9/1991 | Okumura | |
| 6,763,284 B2 | * | 7/2004 | Watanabe et al. | 700/264 |
| 7,814,037 B2 | * | 10/2010 | Ito et al. | 706/23 |
| 8,483,878 B2 | * | 7/2013 | Kumiya et al. | 700/255 |
| 2007/0075048 A1 | * | 4/2007 | Kunisaki et al. | 219/91.1 |
| 2011/0288667 A1 | * | 11/2011 | Noda et al. | 700/98 |
| 2013/0026148 A1 | * | 1/2013 | Aoyama et al. | 219/124.33 |
| 2013/0317646 A1 | * | 11/2013 | Kimoto | 700/250 |

FOREIGN PATENT DOCUMENTS

| | | |
|---|---|---|
| JP | 10-091225 | 4/1998 |
| JP | 2006-243926 | 9/2006 |
| KR | 10-1990-0015861 | 11/1990 |
| KR | 10-2004-0052426 | 6/2004 |
| KR | 10-2011-0062474 | 6/2011 |
| KR | 10-2011-0098068 | 9/2011 |

OTHER PUBLICATIONS

Taeyong Choi et al., "Postprocessing of Direct Teaching Trajectory in Industrial Robot" ISiS 2011, Suwon, Korea, Robotics and Mechatronics Research Center, Korea Institute of Machinery & Materials, (Sep. 28, 2011).*

(Continued)

*Primary Examiner* — Anand Bhatnagar
(74) *Attorney, Agent, or Firm* — Lexyoume IP Meister, PLLC

(57) ABSTRACT

There is provided a method of post-correction of a 3D feature point-based direct teaching trajectory, which improves direct teaching performance by extracting shape-based feature points based on curvature and velocity and improving a direct teaching trajectory correction algorithm using the shape-based feature points. Particularly, there is provided a method of post-correction of a 3D feature point-based direct teaching trajectory, which makes it possible to extract and post-correct a 3D (i.e., spatial) trajectory, as well as a 2D (i.e., planar) trajectory, with higher accuracy.

11 Claims, 14 Drawing Sheets

(56) References Cited

OTHER PUBLICATIONS

C. J. Li et al., "Motion control of the direct-teaching robot at teaching point using trajectory planning algorithm" Korean Society for Precision Engineering, Spring Meeting, pp. 311-312 (Jun. 2011).

Y. Shamash, Y. Yang and Z. Roth, "Teaching a robot", International Encyclopedia of robotics: Applications and Automation, R. C. Dorf, Ed. Wiley, pp. 1689-1701.(1988).

C. H. Park, J. H. Kyung, D. I. Park, K. T. Park, D. H. Kim and D. G. Gweon, "Direct Teaching Algorithm for a Manipulator in a Constraint Condition using the Teaching Force Shaping Method", Advanced Robotics, No. 24, pp. 1365-1384, (Apr. 2, 2012).

Taeyong Choi et al., "Direct Teaching Trajectory Modification using Curvature and Velocity Profile" ICEIC 2012, Jeongseon, Korea, Robotics and Mechatronics Research Center, Korea Institute of Machinery and Materials, (Feb. 1, 2012).

Taeyong Choi et al., "Teaching Data Extraction for the Direct Teaching in Industrial Robot" 2011 8th International Conference on Ubiquitous Robots and Ambient Intelligence, Songdo ConventiA, incheon, Korea, Robotics and Mechatronics Research Center, Korea Institute of Machinery and Materials, (Nov. 23, 2011).

Taeyong Choi et al., "Feature Point Recognition for the Direct Teaching Data in Industrial Robot" The 8th International Conference on Ubiquitous Robots and Ambient Intelligence, Songdo ConventiA, incheon, Korea, Robotics and Mechatronics Research Center, Korea Institute of Machinery and Materials, (Nov. 23, 2011).

M.S.Song, et al., "Direct Teaching and Playback Algorithm of Robot Manipulator" Korean Society for Precision Engineering, May 2010 Spring Conference & English translation of No. 4. Experiments and conclusion.

\* cited by examiner

Original profile

Profile after DPA

Curvature High & Low points

Velocity High & Low points

METHOD OF POST-CORRECTION OF 3D FEATURE POINT-BASED DIRECT TEACHING TRAJECTORY

CROSS-REFERENCE TO RELATED APPLICATION

This application claims priority to and the benefit of Korean Patent Application No. 10-2012-0023054 filed in the Korean Intellectual Property Office on Mar. 6, 2012, the entire contents of which are incorporated herein by reference.

BACKGROUND OF THE INVENTION (a) Field of the Invention

The present invention relates to a method of post-correction of a 3D feature point-based direct teaching trajectory.

(b) Description of the Related Art

Vertical multi-jointed robots used for plant automation are used mainly for welding on an automotive assembly line, automatic transportation of industrial products, and general transportation because of its high velocity and reliability. In order to put these robots into practice, it is necessary to perform teaching, that is, to input a motion trajectory into the robots and so-called "teach" them. Currently, experts use a teaching device to program main trajectories of robots one-by-one. The operation of teaching an industrial robot is to simply program a desired trajectory, which may be considered a simple operation. However, it requires new programming each time according to the type of process in which the industrial robot is used. Also, even if the principle of programming a trajectory is the same, trajectory programming itself is highly complicated and takes a lot of time and effort (Y. Shamash, Y. Yang, and Z. Roth, "Teaching a Robot", International Encyclopedia of Robotics: Applications and Automation, R. C. Dorf, Ed. Wiley, 1988, pp. 1689-1701).

Due to these problems, many studies have been recently done in an attempt to perform teaching in an intelligent manner, taking a break from the conventional teaching methods, and direct teaching is one of these studies (C. H. Park, J. H. Kyung, D. I. Park, K. T. Park, D. H. Kim, and D. G. Gweon, "Direct Teaching Algorithm for a Manipulator in a Constraint Condition using the Teaching Force Shaping Method", Advanced Robotics, no. 24, pp. 1365-1384, 2010). The term "direct teaching" refers to a method in which a user teaches a robot a trajectory while directly holding a tip end of the robot and moving the robot along the trajectory. At this point, the rigidity of the joints of the robot needs to be properly decreased in order to allow the user to handle the joints with ease, and the trajectory needs to be recorded while the user performs direct teaching. Afterwards, the user directly teaches the robot at a point of time when the robot is used and operated in an actual process, thereby making the robot move along the recorded trajectory.

However, it is not easy to accurately record a teaching trajectory because of noise. In most cases, the original trajectory is severely damaged due to low-frequency noise caused by the user's hand shaking and trajectory distortion caused by the user's mistake of failing to properly estimate a trajectory at a corner, as well as usual high-frequency noise generated from a sensor and an electronic circuit. The high-frequency noise may cause an abnormal operation because it requires excessive velocity when reproducing the trajectory as taught, and the low-frequency noise may lead to a significant decrease in the accuracy of the reproduction of the teaching trajectory. However, a current solution, if any, to these problems is to use a line-smoothing algorithm to handle high-frequency noise.

As stated above, the direct teaching method still has a considerable amount of factors that may cause problems when applied to industrial fields. Hence, there are many studies ongoing at the moment to record a trajectory for direct teaching with more accuracy and allow a robot to accurately reproduce the recorded trajectory.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of post-correction of a 3D feature point-based direct teaching trajectory, which improves direct teaching performance by extracting shape-based feature points based on curvature and velocity and improving a direct teaching trajectory correction algorithm using the shape-based feature points. Particularly, the present invention provides a method of post-correction of a 3D feature point-based direct teaching trajectory, which makes it possible to extract and post-correct a 3D (i.e., spatial) trajectory, as well as a 2D (i.e., planar) trajectory, with higher accuracy.

An exemplary embodiment of the present invention provides a method of post-correction of a 3D feature point-based direct teaching trajectory, which corrects a direct teaching trajectory recorded using a direct teaching device including a robot arm including at least one joint, the method including: a feature point extraction step of extracting shape feature points having morphological features from a recorded teaching trajectory measurement value consisting of a three-dimensional position value and a measured time value; and a trajectory calculation step of classifying a segment consisting of the shape feature points as a line or curve to calculate a teaching trajectory after correction. The morphological features may include curvature and velocity.

The feature point extraction step may include: a curvature and velocity feature point determination step for selectively extracting and determining a curvature feature point and a velocity feature point according to predetermined criteria; and a shape feature point determination step for selectively extracting, aligning, and determining a shape feature point according to predetermined criteria by using the determined curvature and velocity feature points.

The curvature and velocity feature point determination step may include: extracting curvature feature point candidates and velocity feature point candidates using Gaussian kernel convolution results of the teaching trajectory measurement value with respect to curvature and velocity; calculating a number of curvature feature point candidates and a number of velocity feature point candidates based on variations in the deviation, and determining a proper deviation according to variations in the number of curvature feature point candidates and the number of velocity feature point candidates; and determining the curvature feature point candidates and the velocity feature point candidates as curvature feature points and velocity feature points, respectively, based on the determined proper deviation.

The shape feature point determination step may include: (a) selecting common feature points from the curvature feature points and the velocity feature points; (b) calculating a first trajectory consisting of line segments joining the neighboring common feature points; (c) selecting a peak curvature feature point and a peak velocity feature point each having a peak value from among the curvature feature points and velocity feature points which do not correspond to the common feature points; (d) calculating temporary trajectories by adding a peak curvature feature point and a peak velocity feature point to the first trajectory, respectively; (e) calculating error values, respectively, by using the orthogonal distance between a teaching trajectory measurement position of the feature points and each of the temporary trajectories; (f) comparing the calculated error values and replacing the first trajectory with one of the temporary trajectories having smaller error values; (g) repeating (c) through (f) with respect to remaining curvature feature points and velocity feature points those are not selected at (c) through (f) and determining an appropriate error value depending on variations in the error values; and (h) determining that the common feature points and the curvature feature points and velocity feature points having the determined appropriate error value or less are shape feature points.

The trajectory calculation step may include: calculating a second trajectory consisting of line segments joining the neighboring shape feature points; calculating a ratio of the length of the second trajectory segments and the length of a curve consisting of the teaching trajectory measurement points with respect to the neighboring shape feature points; classifying a segment between the shape feature points as a line or curve depending on a predetermined line-curve determination reference value; and determining a segment classified as a line to be a straight line joining the shape feature points and determining a segment classified as a curve to be a Bezier curve so that the final teaching trajectory is calculated.

The direct teaching device may further include a torque sensor that measures contact force between a tip end of the direct teaching device and a teaching target. The method of post-correction of a teaching trajectory may further include a trajectory extraction step for extracting a start point and end point of a teaching trajectory using the contact force measured by the torque sensor prior to the trajectory calculation step.

The trajectory extraction step may include: obtaining the sum of contact forces with respect to x, y, and z axes, among the contact forces input from the torque sensor; removing high-frequency noise having a frequency equal to or more than a predetermined noise determination reference value; and deeming a point of time when contact force is firstly generated as the start point and deeming a point of time when the contact force disappears as the end point, to remove trajectory values recorded before the start point and after the end point.

The method of post-correction of a teaching trajectory may further include a trajectory pre-processing step for removing excessive measurement values generated by user teaching delay, among teaching trajectory measurement values, prior to the feature point extraction step and the trajectory calculation step. In the trajectory preprocessing step, excessive measurement values are removed using a DPA (Douglas-Peucker algorithm).

According to the present invention, the performance of direct teaching of a robot is rapidly improved compared to the prior art, thereby allowing the robot to accurately reproduce a trajectory taught by the user. Specifically, the present invention shows excellent performance in removing low-frequency noise generated by the user's hand shaking or mistake at the point of time when the user performs teaching or high-frequency noise generated from an electronic circuit by performing a post-correction process to extract morphological features of teaching data and correct path data to be appropriate for a robot motion.

Particularly, the present invention makes it possible to extract and reproduce a trajectory in a three-dimensional space, as well as a trajectory on a two-dimensional plane, with high accuracy. Therefore, the present invention can rapidly improve operating efficiency when applied to the direct teaching of a robot actually used in an industrial field.

DETAILED DESCRIPTION OF THE EMBODIMENTS

Hereinafter, a method of post-correction of a 3D feature point-based direct teaching trajectory according to the present invention having the above-described configuration will be described in detail with reference to the accompanying drawings.

Figure 1A:
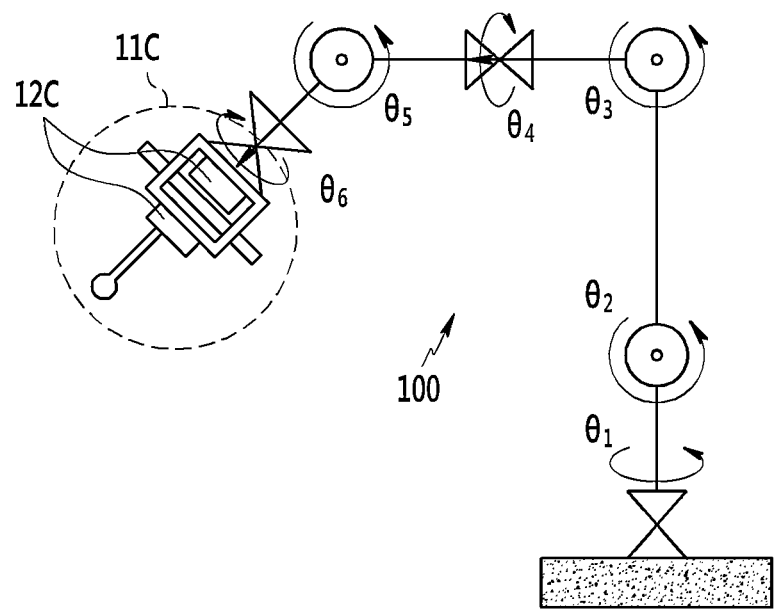
FIG. 1 illustrates a schematic block diagram of a direct teaching device and a photograph of an exemplary embodiment.
Figure 1B:
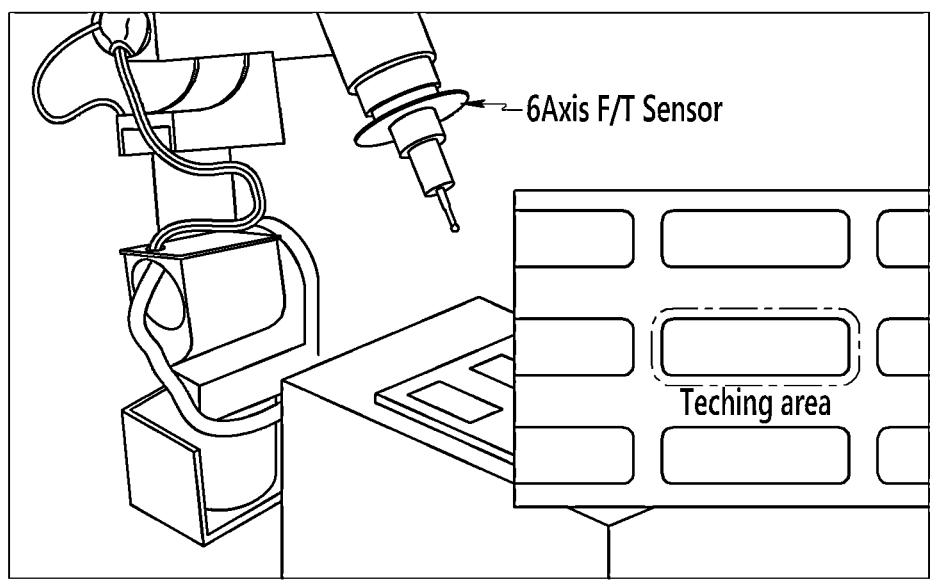

FIG. 1 illustrates a schematic block diagram of a direct teaching device and a photograph of an exemplary embodiment. As illustrated therein, the direct teaching device 100 includes a robot arm including at least one joint. A user teaches the robot a trajectory by directly moving the robot along a trajectory having a desired shape while holding a tip end 110 of the direct teaching device 100. Once a direct teaching trajectory is recorded, the direct teaching device 100 itself may be operated to reproduce the teaching trajectory, or the recorded trajectory may be transplanted into other robots to reproduce the teaching trajectory.

At this point, a considerable amount of distortion and noise may be generated by the user's hand shaking or mistakes, as explained above, because the direct teaching trajectory is made by a human motion. The present invention aims to enhance the accuracy of a direct teaching trajectory by post-correcting a recorded direct teaching trajectory by using a direct teaching device.

Figure 2:
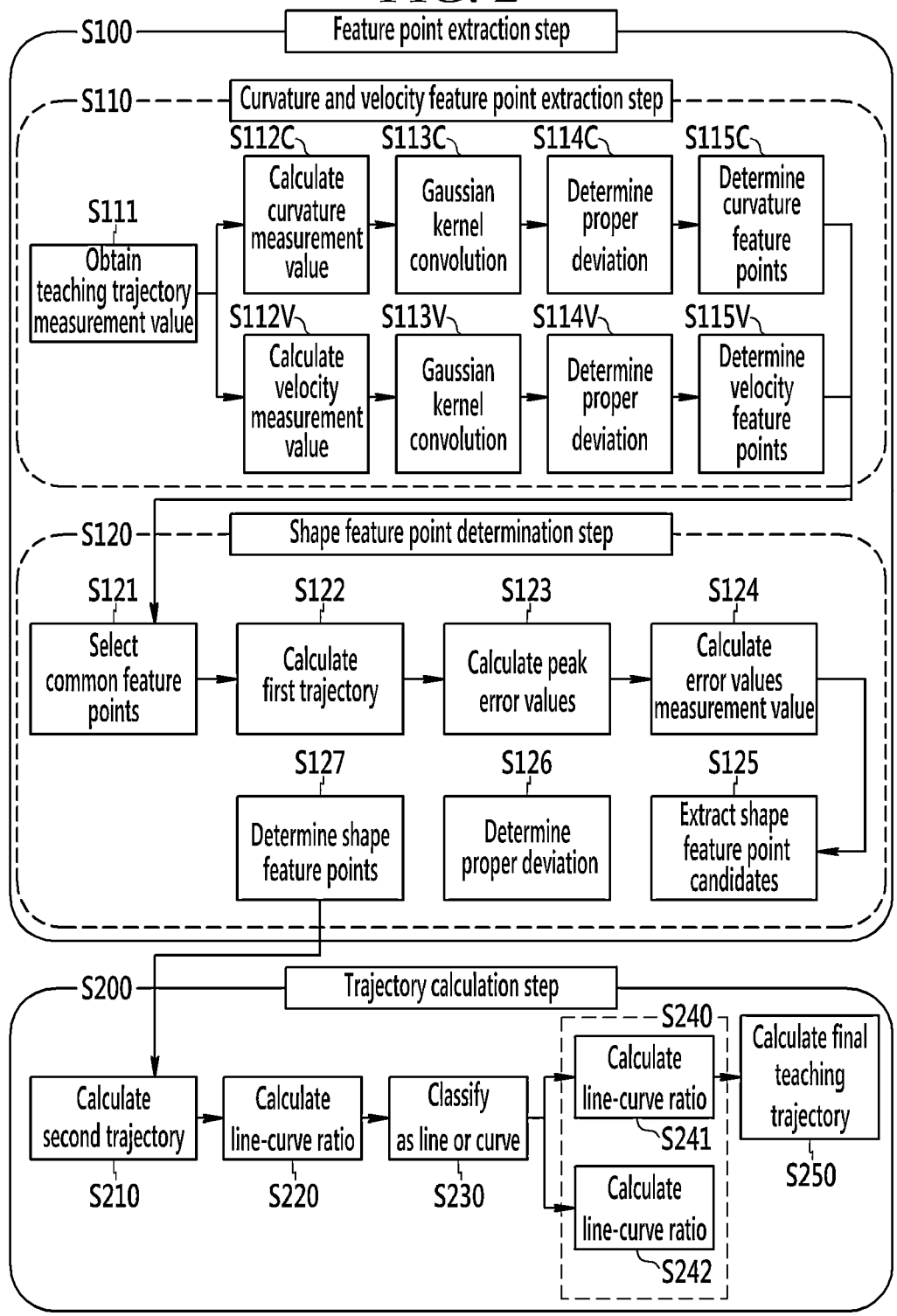
FIG. 2 is a schematic flowchart of the method of post-correction of a teaching trajectory.

In the method of post-correction of a 3D feature point-based direct teaching trajectory according to the present invention, feature points are extracted based on the shape of a teaching trajectory, thereby calculating a teaching trajectory which is simplified compared to actual measurement values and closer to an originally desired shape. FIG. 2 briefly illustrates a flowchart of the method of post-correction of a 3D feature point-based direct teaching trajectory according to the present invention. Referring to FIG. 2, the method of post-correction of a 3D feature point-based direct teaching trajectory according to the present invention will be described more concretely. The method includes: the feature point extraction step S100 of extracting feature points having morphological features from a recorded teaching trajectory measurement value consisting of a three-dimensional position value and a measured time value, and aligning the feature points; and the trajectory calculation step S200 of classifying a segment consisting of the shape feature points as a line or curve to calculate a teaching trajectory after correction.

The morphological features may include curvature and velocity, the principle of which will be summarized. Feature points based on curvature and velocity are extracted using the tendency that the curvature of a shape becomes abruptly larger near a corner than the area surrounding the corner, and the velocity of the shape becomes abruptly smaller near the corner than the area surrounding the corner, and are used to correct a teaching trajectory. As above, curvature and velocity have the tendency that they are considerably strong against morphological changes and show distinctively characteristic changes, and therefore curvature and velocity can be used as morphological features. However, a physical amount other than curvature and velocity can be used as a morphological feature, if it is morphologically strong enough.

Hereinafter, each of the above steps will be explained in detail more concretely. The teaching trajectory extraction step and the teaching trajectory preprocessing step, which are preferably carried out prior to the above steps, will be described first.

Figure 3A:
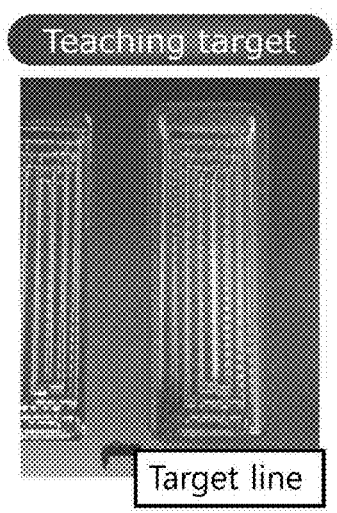
FIG. 3 shows an exemplary embodiment of a teaching trajectory measurement value.
Figure 3B:
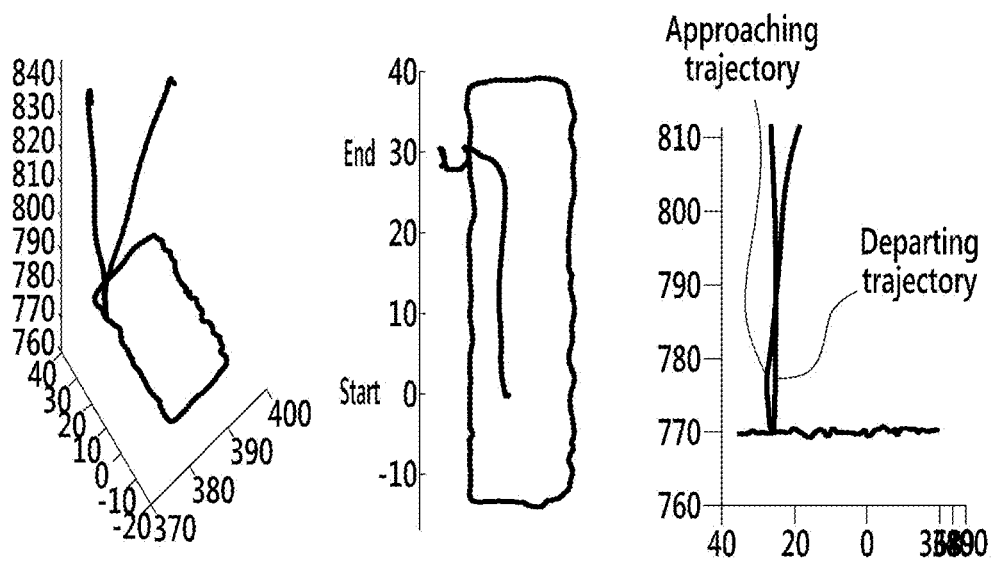

FIG. 3 shows an exemplary embodiment of a teaching trajectory measurement value. When a person teaches a teaching target shown in FIG. 3(A) by moving it along a target line while holding a direct teaching device, an actual teaching trajectory measurement value is considerably inaccurate as shown in FIG. 3(B). Moreover, the teaching trajectory measurement value is obtained by adding an approaching trajectory along which the direct teaching device approaches the teaching target, a shape trajectory along which the direct teaching device moves as actually desired, and a departing trajectory along which the direct teaching device departs from the teaching target. The region indicated by the black line in FIG. 3(B) represents an approaching trajectory and a departing trajectory, which are preferably removed.

Therefore, the method of post-correction of a teaching trajectory preferably further includes the step of extracting only a shape trajectory prior to shape trajectory correction (i.e., the feature point extraction step S100 and the trajectory calculation step S200). Referring to FIG. 1, a torque sensor 120 may be further provided to measure the contact force between the tip end 110 of the direct teaching device 100 and the teaching target. In further detail, the torque sensor 120 provided at the tip end 110 of the direct teaching device 100 can be used to measure the contact force between the tip end 110 of the direct teaching device 100 and the teaching target or measure the teaching force generated when a person pushes and pulls the direct teaching device 100 (the teaching force is used to control the rigidity of the robot arm of the direct teaching device 100 during direct teaching). Herein, the contact force is measured and used for trajectory extraction. That is, the trajectory extraction step may be implemented by allowing the torque sensor 120 to measure contact force and extracting the start point and end point of a teaching trajectory using the contact force measured by the torque sensor 120.

The trajectory extraction step will be described below in detail. In general, the torque sensor 120 measures contact force with respect to six axes. First, the sum of contact forces with respect to x, y, and z axes, among the contact forces input from the torque sensor 120, is obtained. Next, first of all, high-frequency noise having a frequency equal to or more than a predetermined noise determination reference value is removed. In general, such high-frequency noise is generated from a sensor, an electronic circuit, etc., which has a value that cannot be actually generated by a human motion. The noise determination reference value may be properly determined with reference to generally known high-frequency noise values.

After noise is removed, a point of time when contact force is firstly generated is deemed as the start point and a point of time when the contact force disappears is deemed as the end point, and trajectory values recorded before the start point and after the end point are removed. That is, the trajectory value before the start point becomes the approaching trajectory in FIG. 3(B), and the trajectory value after the end point becomes the departing trajectory in FIG. 3(B). After removing these trajectory values, only the shape trajectory remains, and the final teaching trajectory is ultimately calculated by correcting the shape trajectory.

Figure 4A:
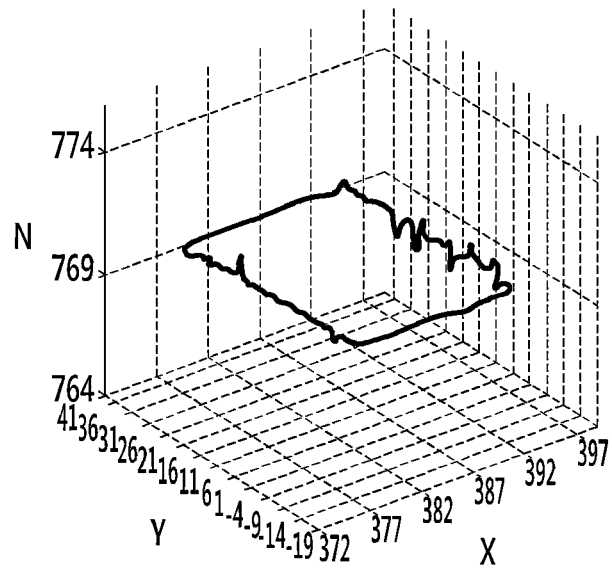
FIG. 4 illustrates an exemplary embodiment of the preprocessing of a teaching trajectory measurement value.
Figure 4B:
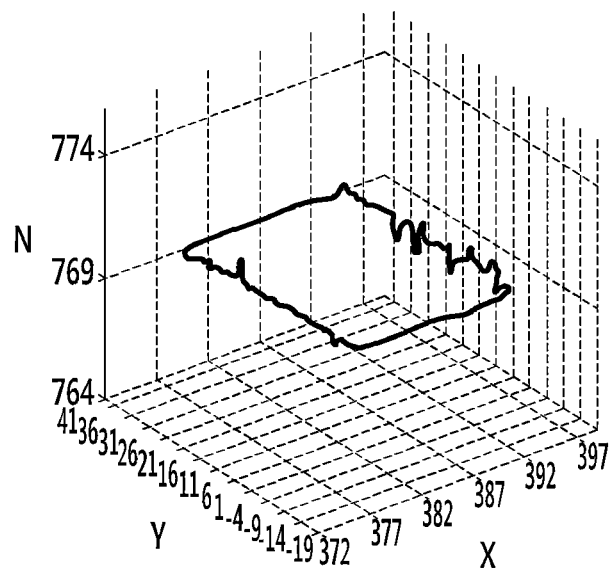

FIG. 4 illustrates an exemplary embodiment of the preprocessing of a teaching trajectory measurement value. When a person carries and moves the direct teaching device in an actual direct teaching process, the person cannot always move correctly at a constant velocity. For example, it is unavoidable for the person to hesitate or the like at a certain position. The direct trajectory measurement value consists of a three-dimensional position value and a measured time value, as explained above. In this case, excessive measurement values with almost the same position recorded therein are generated in the vicinity of the relevant position (i.e., where the person hesitated) even with the passage of time. A calculation using all of these measurement values requires a fairly large amount of calculation, and this brings about the problems of long calculation time and high calculation load.

Therefore, in the method of post-correction of a teaching trajectory, it is preferable that the trajectory preprocessing step for removing these excessive measurement values is performed prior to shape trajectory correction. That is, the trajectory preprocessing step is to remove excessive measurement values generated by user teaching delay, which can be easily implemented using a DPA (Douglas-Peucker algorithm), among teaching trajectory measurement values. Briefly, the DPA is an algorithm that uses measurement points among a plurality of measurement points farther than a reference value, and measurement points within a short distance are discarded. The DPA is widely used for line-smoothing or the like since introduced by Douglass and Peucker in 1973.

As described above, conventional correction of a direct teaching trajectory only involves performing line-smoothing (which is equivalent to the trajectory preprocessing step in the present invention), and therefore a considerable amount of distortion and damage occurs. However, the present invention rapidly increases the accuracy of a teaching trajectory by further post-correcting a direct teaching trajectory by the feature point extraction step S100 and the trajectory calculation step S200, which are to be described in detail below.

Firstly, the feature point extraction step S100 will be described. The following description will be made with respect to the case where the morphological features are curvature and velocity. However, the morphological features may be other physical amounts as described above. In this case, correction will be made through steps similar to the steps to be explained hereinafter. As described above, in the feature point extraction step S100, shape feature points based on curvature and velocity are extracted with respect to a recorded teaching trajectory measurement value consisting of a three-dimensional position value and a measured time value. More specifically, the feature point extraction step includes: the curvature and velocity feature point determination step S110 for selectively extracting and determining a curvature feature point and a velocity feature point according to predetermined criteria; and the shape feature point determination step S120 for selectively extracting, aligning, and determining a shape feature point according to predetermined criteria by using the determined curvature and velocity feature points.

The curvature and velocity feature point determination step S110 will now be described. Referring to FIG. 2, the curvature and velocity feature point determination step S110 is performed after the step S110 of obtaining a teaching trajectory measurement value. The step S110 of obtaining a teaching trajectory measurement value may include only the step of obtaining a measurement value while performing first direct teaching, or may include either one or both of the trajectory extraction step (removal of the approaching trajectory and the departing trajectory) and the trajectory preprocessing step (removal of excessive measurement values) which have been described above.

Once a teaching trajectory measurement value is obtained (S111), the value is represented as a three-dimensional position value matched with a measured time. Accordingly, the curvature is calculated using position values (S112C), and the velocity is calculated using position and time values (S112V).

Next, curvature feature point candidates and velocity feature point candidates are extracted using Gaussian kernel convolution results of the teaching trajectory measurement value with respect to curvature and velocity (S113C and S113V). The following Equation 1 is an equation for the Gaussian kernel, in which f indicates the Gaussian kernel, x indicates a deviation, and c indicates a constant. Such a Gaussian kernel convolution-based smoothing technique is widely known, so a detailed description thereof will be omitted.

$$f(x) = e^{\left(-\frac{(x-c)^2}{2\sigma^2}\right)}.$$ (Equation 1)

Figure 5A:
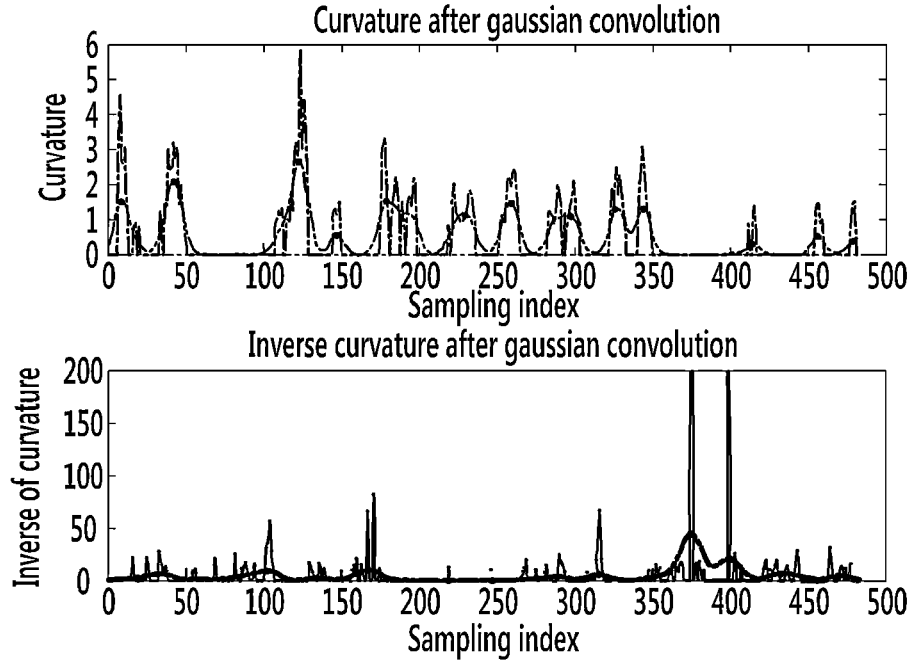
FIG. 5 illustrates Gaussian kernel convolution results with respect to curvature and velocity.
Figure 5B:
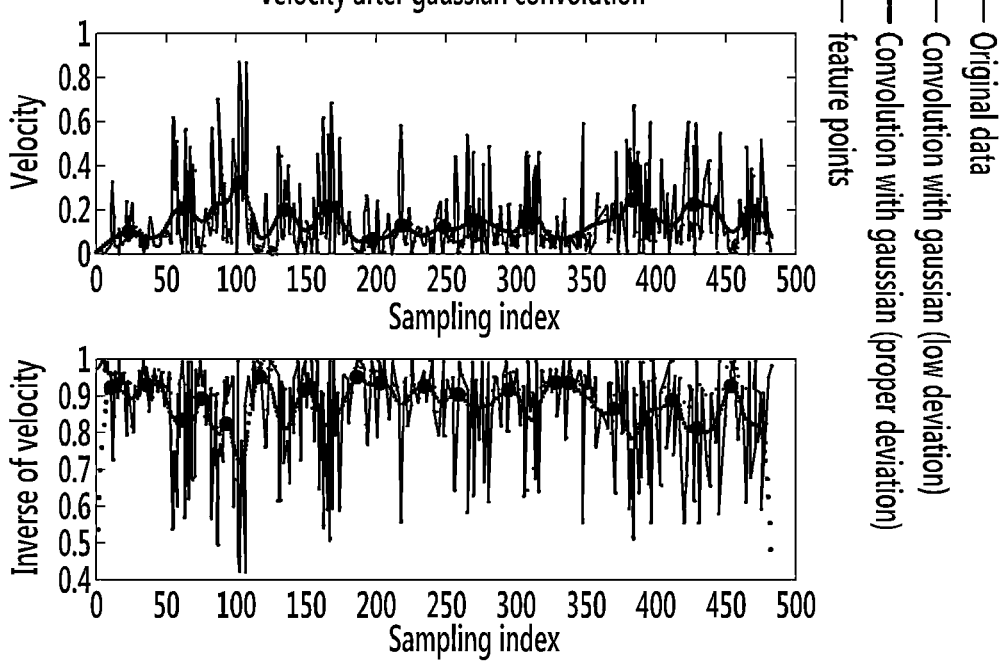

FIG. 5 illustrates Gaussian kernel convolution results with respect to the curvature and velocity obtained for a number of deviations. FIG. 5 illustrates all of the results with respect to curvature, invert curvature, velocity, and invert velocity, As explained above, the curvature becomes abruptly larger near a corner and the velocity becomes abruptly smaller near the corner, that is, the curvature and the velocity values are opposite to each other. Thus, it will be convenient for one of the two to be inverted. Although the respective feature points are calculated using a value of {curvature/invert velocity}, a value of {invert curvature/velocity}, a value of (curvature/velocity), or a value of {invert curvature/invert velocity} may also be used. That is, "Gaussian kernel convolution results with respect to curvature and velocity" may be obtained with respect to any of the following: {curvature/invert velocity}, {invert curvature/invert velocity}, {curvature/velocity}, and {invert curvature/invert velocity}. The following description will be made on the case where the value of {curvature/invert velocity} is used. The other values work on the same principle, though slightly different, so the description thereof will be omitted.

Figure 6A:
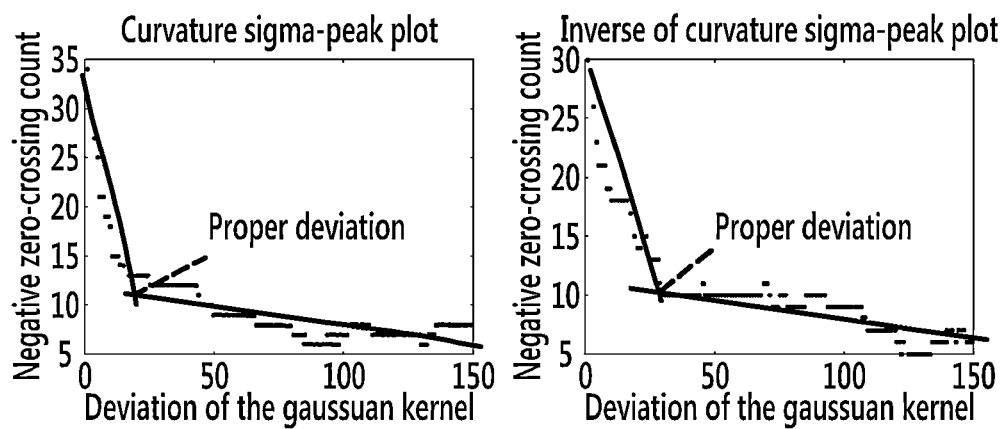
FIG. 6 illustrates the number of curvature feature points and the number of velocity feature points depending on deviation.
Figure 6B:
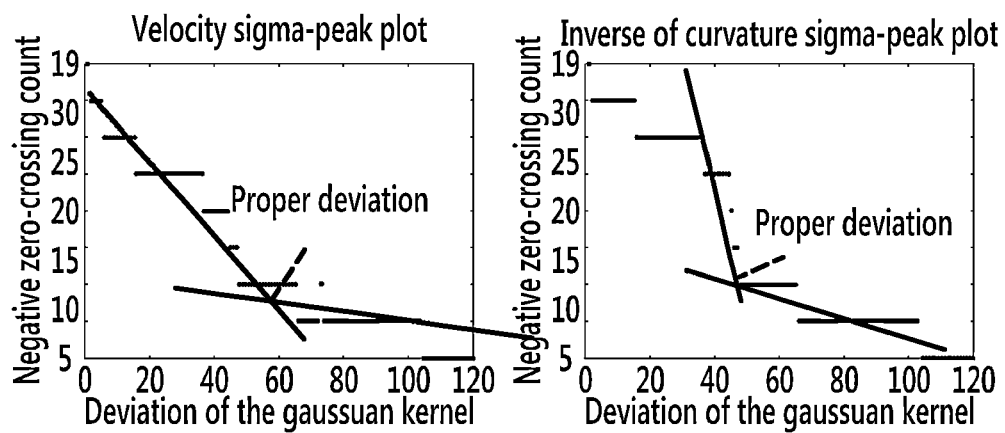

Next, the number of curvature feature point candidates and the number of velocity feature point candidates are calculated based on variations in the deviation, and a proper deviation is determined according to variations in the number of curvature feature point candidates and the number of velocity feature point candidates (S114C and S114V). When obtaining a convolution value while varying the deviation, the number of feature points gradually decreases as the deviation increases, provided that {curvature/invert velocity} is used as described above. FIG. 6 illustrates the number of curvature feature points and the number of velocity feature points depending on deviation. It can be seen that, as the deviation increases, the number of curvature feature point candidates and the number of velocity feature point candidates abruptly decrease until a certain point of time, and the number of curvature feature point candidates and the number of velocity feature point candidates remain relatively constant from a certain point of time onwards. The deviation at this point of time is determined as the proper deviation.

Finally, the curvature and velocity feature point determination step S110 is completed by determining the curvature feature point candidates and the velocity feature point candidates as curvature feature points and velocity feature points, respectively, based on the determined proper deviations (S115C and S115V).

The shape feature point determination step S120 will be described. As stated above, even if the curvature feature points and the velocity feature points are obtained, there is still a difficulty trajectory simplification because a considerable calculation amount is required to calculate a trajectory using all of these feature points. Therefore, the curvature feature points and the velocity feature points are properly combined to select and determine shape feature points.

Figure 7A:
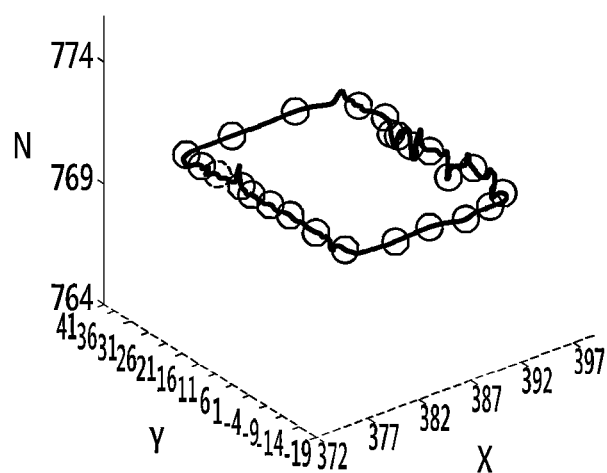
FIG. 7 illustrates the results of determination of curvature and velocity feature points.
Figure 7B:
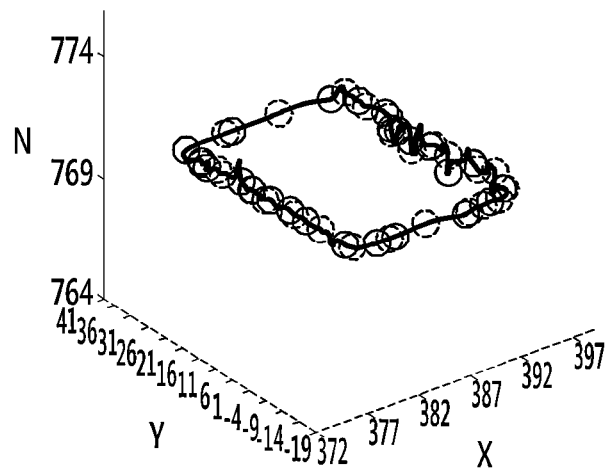

First, common feature points are selected from the curvature feature points and the velocity feature points (S121). FIG. 7 three-dimensionally illustrates the results of determination of curvature and velocity feature points, from which it can be observed that there are overlapping points between the curvature feature points and the velocity feature points. Using the common feature points, a first trajectory consisting of line segments joining the neighboring common feature points is calculated (S122). All of the common feature points become shape feature points. At this point, more shape feature points are selected through the following process in order to accurately correct the trajectory.

First, the peak curvature feature point and the peak velocity feature point each having the peak value are selected from among the curvature feature points and velocity feature points which do not correspond to the common feature points, and the selected error values are added to the first trajectory and temporary trajectories are calculated, respectively. Each error values are calculated by using the orthogonal distance between a teaching trajectory measurement position of the feature points and each of the temporary trajectory, and the calculated error values are compared and the first trajectory is replaced by one of the temporary trajectories having smaller error values (S123).

Figure 8:
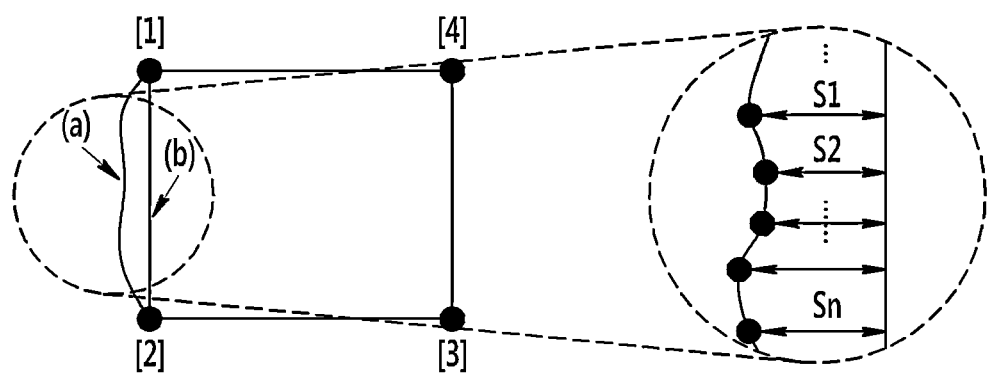
FIG. 8 shows the definition of the orthogonal distance between a teaching trajectory measurement position and a first trajectory.

Moreover, with respect to the remaining curvature feature points and velocity feature points which are not selected at the above step (i.e., curvature/velocity feature points other than the common feature points or the peak curvature/velocity feature points), respectively, S123 is repeated (S124). In this way, even the curvature feature points and velocity feature points other than the common feature points become candidates of final shape feature points to be determined, i.e., shape feature point candidates. The following Equation 2 is an equation for calculating an error value, in which $F_i$ denotes a shape feature point candidate, c denotes an error, s denotes a teaching trajectory measurement position of the corresponding shape feature point candidates, S denotes a teaching trajectory measurement position value, and OD denotes the orthogonal distance between a teaching trajectory measurement position of the corresponding feature points and the first trajectory. FIG. 8 shows the definition of the orthogonal distance between a teaching trajectory measurement position and a first trajectory.

$$\varepsilon(F_i) = \frac{1}{|S|} \sum_{s \in S} OD(s, F_i) \qquad \text{(Equation 2)}$$

Figure 9:
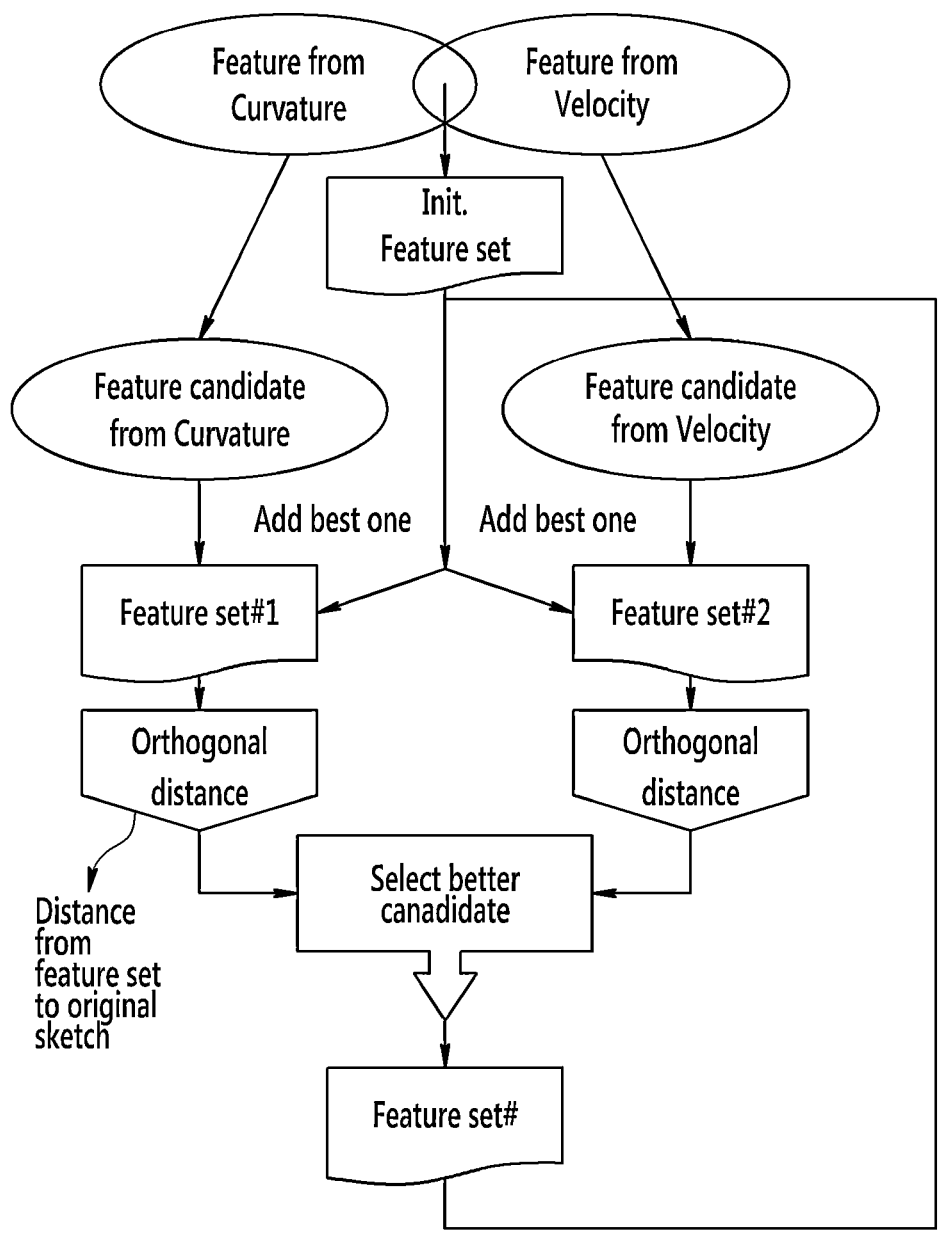
FIG. 9 illustrates a detailed step of extracting shape feature point candidates.

Next, the above error values are compared to extract and align shape feature point candidates having smaller error values (S125). This step will be illustrated in more detail in FIG. 9. Referring to FIG. 9, first of all, error values for the peak curvature feature point and the peak velocity feature point are compared with error values for a certain curvature feature point and a certain velocity feature point (which respectively become shape feature point candidates). Among them, feature points having a smaller error value are selected, and this process is repeated for the next curvature feature point and the next velocity feature point. By doing so, shape feature point candidates can be aligned according to the error values. The following example of an algorithm, an example for implementing these steps, is created according to the flowchart shown in FIG. 9.

| Algorithm 1 Hybrid feature selection |
| --- |
| 1: procedure FEATURE MERGE(C, V) |
| 2:      ▷ C:Curvature feature, V:Velocity feature |
| 3:      $F_0 \leftarrow C \cap V$ |
| 4:      $CL \leftarrow C - F_0; VL \leftarrow V - F_0$ |
| 5:      for All CL and VL do |
| 6:          $i \leftarrow i + 1$ |
| 7:          $C_{MAX} \leftarrow \text{Max}(CL)$ |
| 8:          $V_{MAX} \leftarrow \text{Max}(VL)$ |
| 9:          $F_{i_c} \leftarrow F_{i-1} \cup C_{MAX}$ |
| 10:         $F_{i_v} \leftarrow F_{i-1} \cup V_{MAX}$ |
| 11:         if $\varepsilon(F_{i_c}) \leftarrow \varepsilon (F_{i_v})$ then      ▷ $\varepsilon$ of (5) |
| 12:            $F_i \leftarrow F_{i_c}$ |
| 13:            $CL \leftarrow CL - C_{MAX}$ |
| 14:            $VL \leftarrow VL$ |
| 15:         else |
| 16:            $F_i \leftarrow F_{i_v}$ |
| 17:            $CL \leftarrow CL$ |
| 18:            $VL \leftarrow VL - V_{MAX}$ |
| 19:         end if |
| 20:      end for |
| 21: end procedure |

Figure 10:
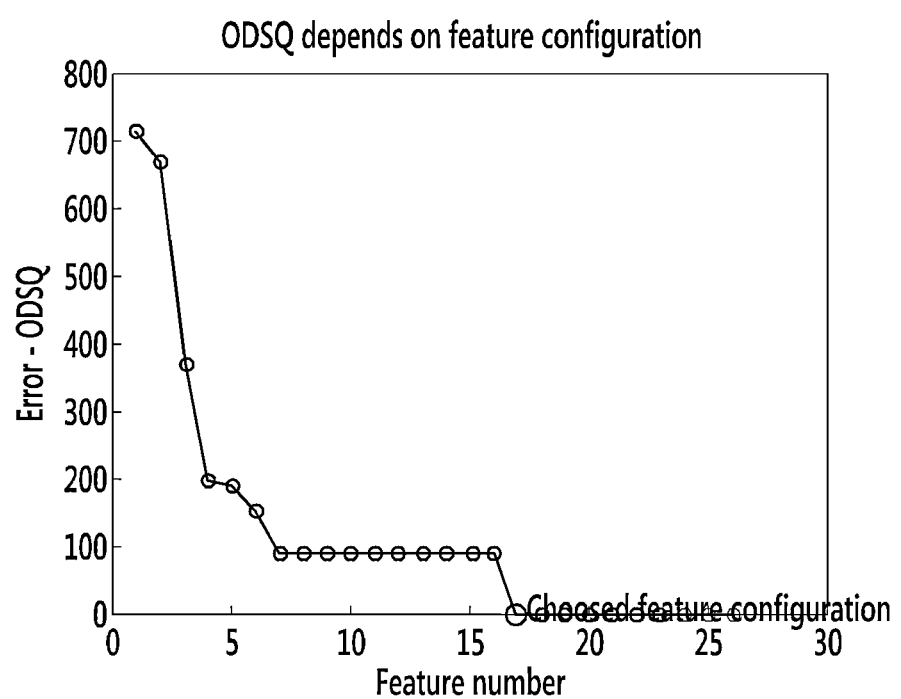
FIG. 10 illustrates variations in the error values.

Next, an appropriate error value is determined depending on variations in the errors values of the shape feature point candidates (S126). FIG. 10 illustrates variations in the error values of the thus-aligned shape feature point candidates. It can be seen that, as the feature number of the shape feature point candidates increases (in a similar manner to the appropriate deviation determination process shown in FIG. 6), the error value abruptly decreases until a certain point of time and remains relatively constant from a certain point of time. The error at this point of time is determined as the appropriate error value. In the illustration of FIG. 10, a considerable amount of shape feature point candidates is included even when the error value is 0. It is preferable that this error value is determined as the appropriate error value. Of course, as long as the error value is small enough and enough shape feature point candidates are included, the error value satisfying this condition can be determined as the appropriate error value, even if the appropriate error value is not necessarily 0.

Finally, the shape feature point determination step S120 is completed by determining that the common feature points and the curvature feature points and velocity feature points having the determined appropriate error value or less are shape feature points (S127). More specifically, as explained above, the common feature points are determined as shape feature points as soon as they are selected. Moreover, the remaining curvature and velocity feature points not corresponding to the common feature points are determined as shape feature point candidates, and ones having an appropriate error value or less are found among them by the method shown in FIG. 9 or the like, and collectively determined as shape feature points.

Figure 11:
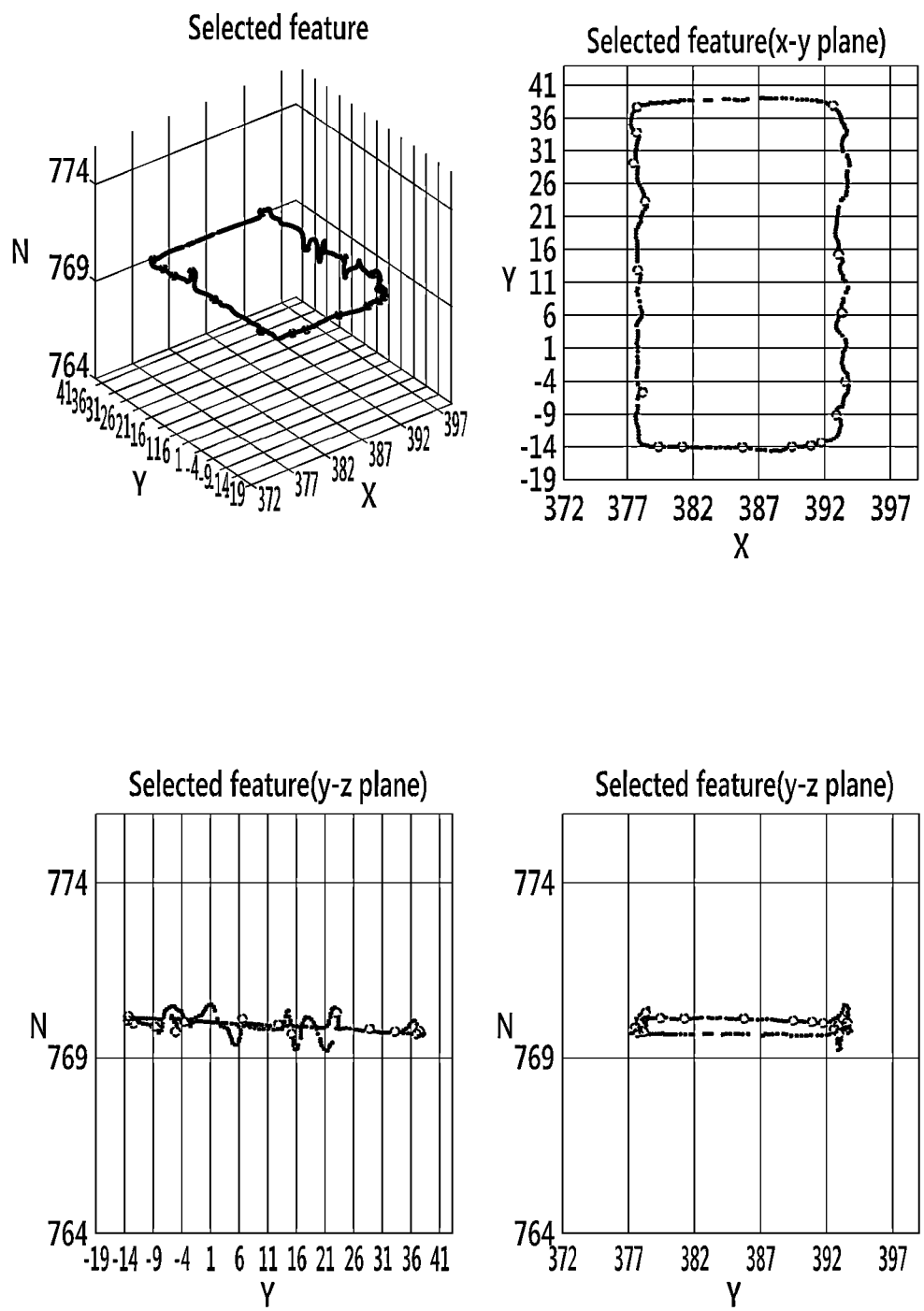
FIG. 11 illustrates shape feature points extracted after completion of the feature point extraction step.

Secondly, the trajectory calculation step S200 will be described. As described above, in the trajectory calculation step S200, a segment consisting of the shape feature points is classified as a line or curve to calculate a teaching trajectory after correction. FIG. 11 three-dimensionally illustrates shape feature points obtained by the feature point extraction step S100 including the curvature and velocity feature point determination step S110 and the shape feature point determination step S120. Now, a teaching trajectory can be calculated by properly connecting these shape feature points.

Figure 12:
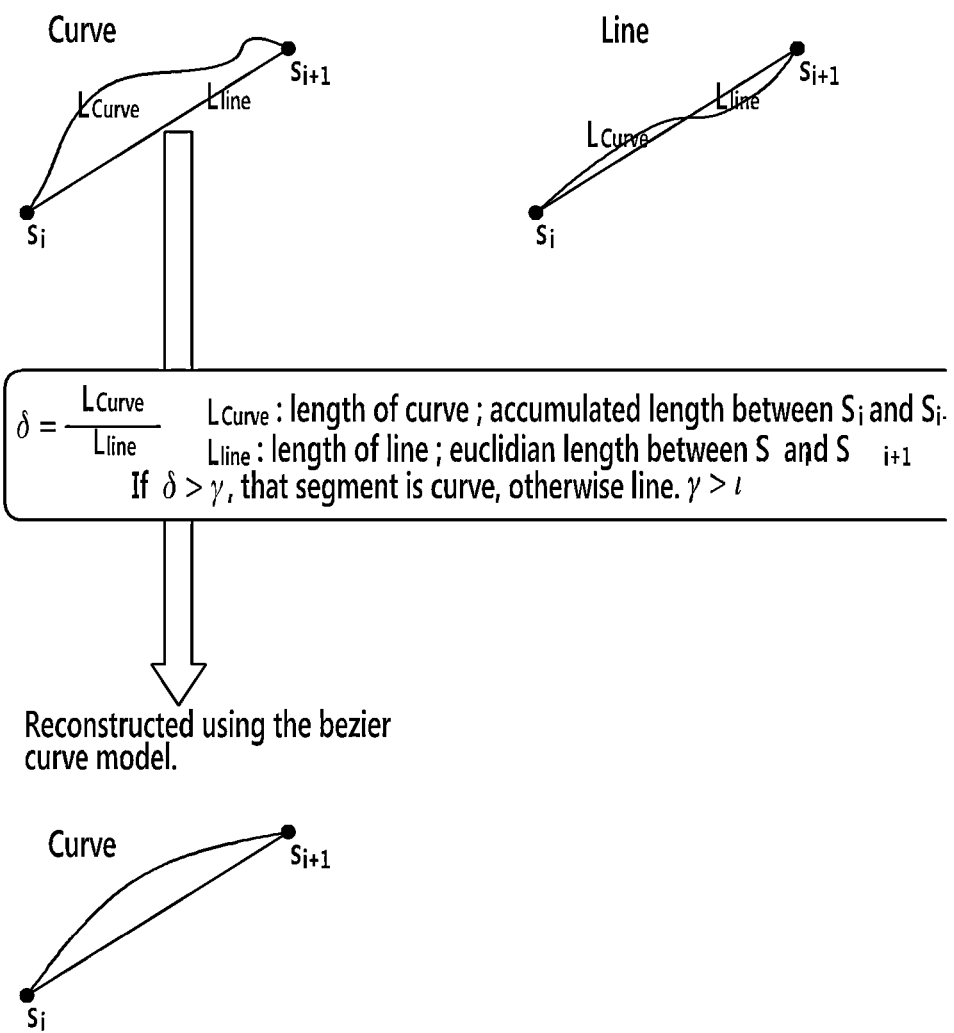
FIG. 12 illustrates the principle of line-curve classification.

First, a second trajectory consisting of line segments joining the neighboring shape feature points is calculated (S210). Next, the ratio δ of the length of the second trajectory segments and the length of a curve consisting of the teaching trajectory measurement points is calculated with respect to the neighboring shape feature points, as shown in the following Equation 3 (S220). In the following Equation 3, δ denotes the ratio, $L_{curve}$ denotes the length of a curve consisting of the teaching trajectory measurement points between the neighboring shape feature points, and $L_{line}$ denotes the length of the second trajectory segments between the neighboring shape feature points. FIG. 12 illustrates the principle of line-curve classification.

$$\delta = \frac{L_{curve}}{L_{line}} \qquad \text{(Equation 3)}$$

Next, a segment between the shape feature points is classified as a line or curve depending on a predetermined line-curve determination reference value γ (S230). The line-curve determination reference value γ can be properly determined in advance. Preferably, the line-curve determination reference value is determined as a value of 1 or more (γ>1). More specifically, if the ratio δ obtained by Equation 3 is greater than the line-curve determination reference value (γ) (δ>γ), the segment is classified as a curve. Otherwise, the segment is classified as a line.

Finally, the line-curve determination step S240 is performed, in which a segment classified as a line is determined to be a straight line joining the shape feature points (S241), and a segment classified as curve is determined to be a Bezier curve (S242). After that, the final teaching trajectory is calculated according to the determinations, thereby completing all the steps.

Figure 13:
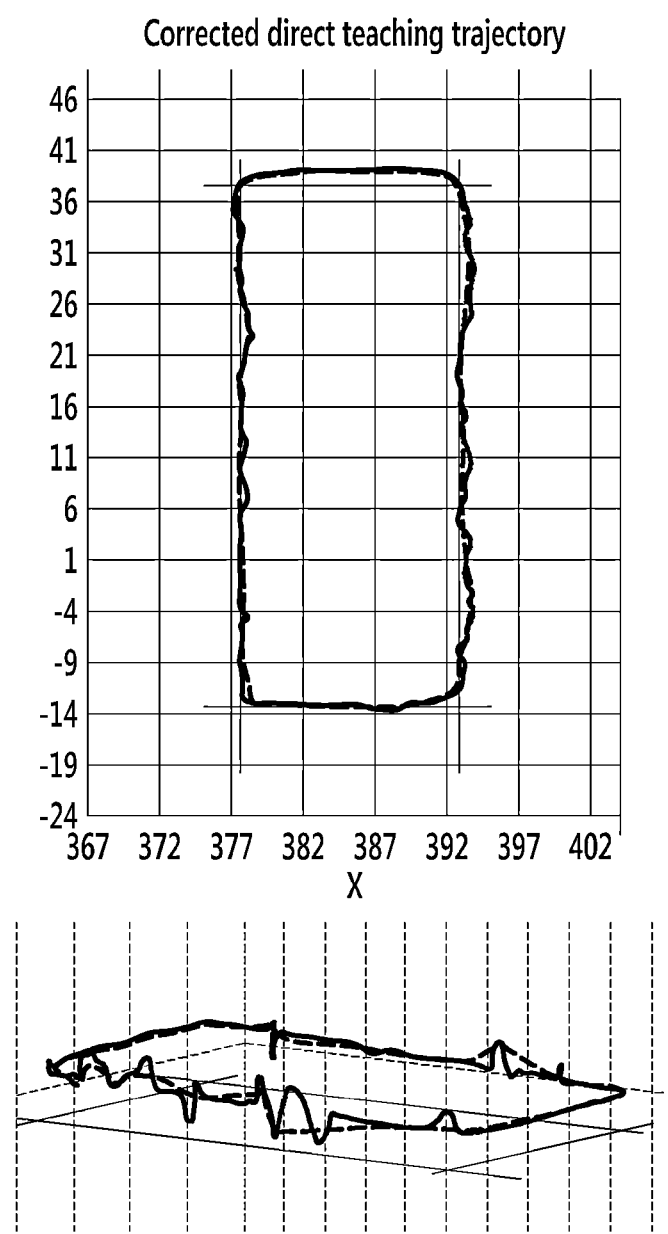
FIG. 13 illustrates the teaching trajectory calculated after completion of the trajectory calculation step.

FIG. 13 illustrates the final teaching trajectory calculated after completion of the trajectory calculation step. The region indicated in black represents a teaching trajectory measurement value, and the region indicated in red represents the final teaching trajectory, i.e., the teaching trajectory correction value, calculated after post-correction as described above. In FIG. 13, it can be seen that a simplified teaching trajectory with high accuracy is calculated by the method of the present invention.

Figure 14:
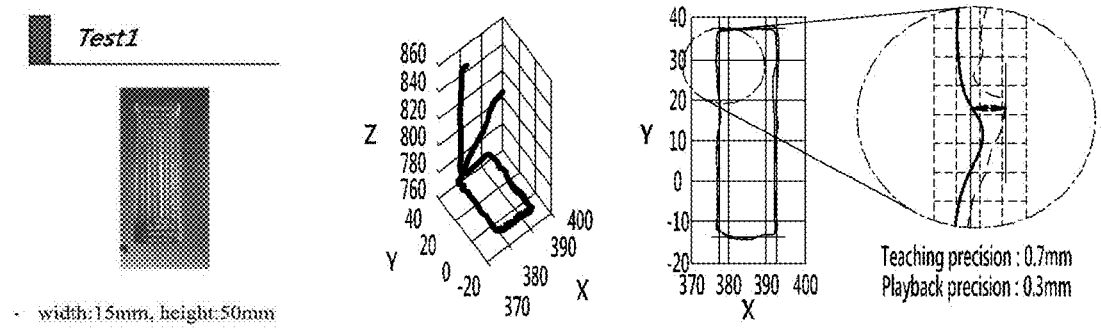
FIG. 14 illustrates further exemplary embodiments of a teaching trajectory calculated by the method of post-correction of a teaching trajectory according to the present invention.
Figure 14:
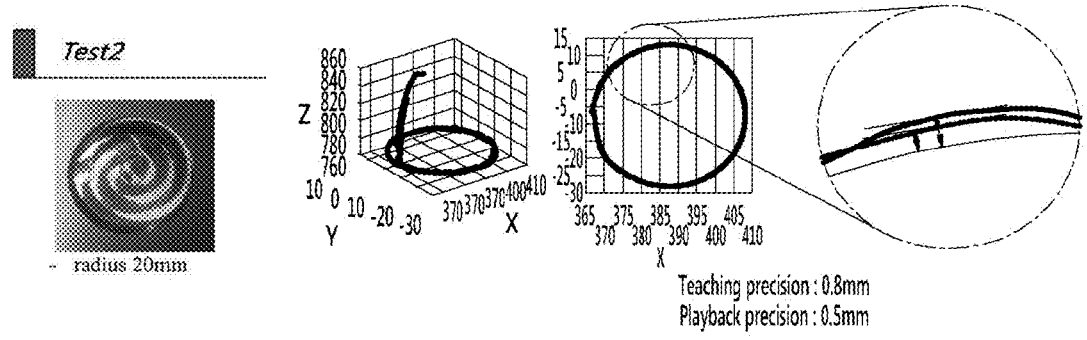

FIG. 14 illustrates further exemplary embodiments of a teaching trajectory calculated by the method of post-correction of a teaching trajectory according to the present invention. A teaching trajectory measurement value and a teaching trajectory correction value are depicted for teaching targets having a rectangular shape and a circular shape. An error for a rectangular teaching target is about 0.25 mm and an error for a circular teaching target is about 0.19 mm because correction simply using DPA is conventionally performed, as explained above. Using the method of the present invention, however, it can be confirmed that an error for a rectangular teaching target is about 0.12 mm and an error for a circular teaching target is about 0.14 mm, thereby improving teaching performance by 30% or more on average.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of post-correction of a 3D feature point-based direct teaching trajectory, which corrects a direct teaching trajectory recorded using a direct teaching device including a robot arm including at least one joint, the method comprising:
   a feature point extraction step of extracting shape feature points having morphological features from a recorded teaching trajectory measurement value consisting of a three-dimensional position value and a measured time value; and
   a trajectory calculation step of classifying a segment consisting of the shape feature points as a line or curve to calculate a teaching trajectory after correction.

2. The method of claim 1, wherein the morphological features comprise curvature and velocity.

3. The method of claim 1, wherein the feature point extraction step comprises:
   a curvature and velocity feature point determination step for selectively extracting and determining a curvature feature point and a velocity feature point according to predetermined criteria; and
   a shape feature point determination step for selectively extracting, aligning, and determining a shape feature point according to predetermined criteria by using the determined curvature and velocity feature points.

4. The method of claim 3, wherein the curvature and velocity feature point determination step comprises:
   extracting curvature feature point candidates and velocity feature point candidates using Gaussian kernel convolution results of the teaching trajectory measurement value with respect to curvature and velocity;
   calculating a number of curvature feature point candidates and a number of velocity feature point candidates based on variations in the deviation, and determining a proper deviation according to variations in the number of curvature feature point candidates and the number of velocity feature point candidates; and
   determining the curvature feature point candidates and the velocity feature point candidates as curvature feature points and velocity feature points, respectively, based on the determined proper deviation.

5. The method of claim 3, wherein the shape feature point determination step comprises:
   (a) selecting common feature points from the curvature feature points and the velocity feature points;
   (b) calculating a first trajectory consisting of line segments joining the neighboring common feature points;
   (c) selecting a peak curvature feature point and a peak velocity feature point each having a peak value from among the curvature feature points and velocity feature points which do not correspond to the common feature points;
   (d) calculating temporary trajectories by adding a peak curvature feature point and a peak velocity feature point to the first trajectory, respectively;
   (e) calculating error values, respectively, by using the orthogonal distance between a teaching trajectory measurement position of the feature points and each of the temporary trajectories;
   (f) comparing the calculated error values and replacing the first trajectory with one of the temporary trajectories having smaller error values;
   (g) repeating (c) through (f) with respect to remaining curvature feature points and velocity feature points those are not selected at (c) through (f) and determining an appropriate error value depending on variations in the error values; and
   (h) determining that the common feature points and the curvature feature points and velocity feature points having the determined appropriate error value or less are shape feature points.

6. The method of claim 1, wherein the trajectory calculation step comprises:
   calculating a second trajectory consisting of line segments joining the neighboring shape feature points;
   calculating a ratio of the length of the second trajectory segments and the length of a curve consisting of the teaching trajectory measurement points with respect to the neighboring shape feature points;
   classifying a segment between the shape feature points as a line or curve depending on a predetermined line-curve determination reference value; and
   determining a segment classified as a line to be a straight line joining the shape feature points and determining a segment classified as curve to be a Bezier curve so that the final teaching trajectory is calculated.

7. The method of claim 1, wherein the direct teaching device further comprises a torque sensor that measures contact force between a tip end of the direct teaching device and a teaching target.

8. The method of claim 7, further comprising a trajectory extraction step for extracting a start point and end point of a teaching trajectory using the contact force measured by the torque sensor prior to the trajectory calculation step.

9. The method of claim 8, wherein the trajectory extraction step comprises:
   obtaining the sum of contact forces with respect to x, y, and z axes, among the contact forces input from the torque sensor;

removing high-frequency noise having a frequency equal to or more than a predetermined noise determination reference value;

deeming a point of time when contact force is firstly generated as the start point and deeming a point of time when the contact force disappears as the end point, to remove trajectory values recorded before the start point and after the end point.

10. The method of claim 1, further comprising a trajectory pre-processing step for removing excessive measurement values generated by user teaching delay, among teaching trajectory measurement values, prior to the feature point extraction step and the trajectory calculation step.

11. The method of claim 10, wherein, in the trajectory preprocessing step, excessive measurement values are removed using a DPA (Douglas-Peucker algorithm).

* * * * *